(12) United States Patent
Park et al.

(10) Patent No.: US 8,523,509 B2
(45) Date of Patent: Sep. 3, 2013

(54) ROBOT

(75) Inventors: Kang Min Park, Daejeon (KR); Ja Woo Lee, Seoul (KR); Yong-Jae Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 843 days.

(21) Appl. No.: 12/588,765

(22) Filed: Oct. 27, 2009

(65) Prior Publication Data

US 2010/0147098 A1   Jun. 17, 2010

(30) Foreign Application Priority Data

Dec. 11, 2008   (KR) .................. 10-2008-0125756

(51) Int. Cl.
*B25J 15/12* (2006.01)
*B25J 17/02* (2006.01)
*B25J 15/10* (2006.01)
*B25J 18/00* (2006.01)
*F16H 29/20* (2006.01)

(52) U.S. Cl.
USPC ........... 414/736; 414/729; 294/111; 294/200; 74/89.22; 74/490.04; 74/490.06; 901/21; 901/36; 901/38

(58) Field of Classification Search
USPC .............. 414/744.1, 729, 735; 901/21, 36, 901/38; 294/111, 200; 74/89.22, 490.04, 74/490.06
See application file for complete search history.

(56) References Cited

U.S. PATENT DOCUMENTS

| | | | | |
|---|---|---|---|---|
| 4,913,617 A | * | 4/1990 | Nicholson | 414/729 |
| 4,921,293 A | * | 5/1990 | Ruoff et al. | 294/111 |
| 4,986,723 A | * | 1/1991 | Maeda | 414/729 |
| 6,685,698 B2 | * | 2/2004 | Morley et al. | 606/1 |
| 6,969,385 B2 | * | 11/2005 | Moreyra | 606/1 |
| 2009/0173177 A1 | * | 7/2009 | Sugawara et al. | 74/490.03 |

* cited by examiner

*Primary Examiner* — Saul Rodriguez
(74) *Attorney, Agent, or Firm* — Staas & Halsey LLP

(57) ABSTRACT

A robot has a structure in which finger joints do not interfere with each other. The robot includes a first actuator driving the finger joint, a first power transmission, a second actuator driving the finger joint, and a second power transmission. The first actuator and the first power transmission are coupled with a wrist joint so that the position of the first actuator and the first power transmission is changed. Accordingly, even if the wrist joint operates, the distance between the first actuator and the finger joint is constantly maintained.

11 Claims, 8 Drawing Sheets

ROBOT

CROSS-REFERENCE TO RELATED APPLICATIONS

This application claims the priority benefit of Korean Patent Application No. 10-2008-0125756, filed on Dec. 11, 2008, in the Korean Intellectual Property Office, the disclosure of which is incorporated herein by reference.

BACKGROUND

1. Field

Exemplary embodiments relate to a robot. More particularly, exemplary embodiments relate to a robot including an actuator having an improved structure to drive finger joints.

2. Description of the Related Art

The use range of a robot has been gradually enlarged over all industrial fields. In particular, studies and research on a human-type robot have been accelerated. Accordingly, in order to conduct housework instead of a human being, the human-type robot must safely and quickly grasp and manipulate a variety of objects.

Since the human-type robot has a restricted hand size, several large-scale motors cannot be installed in robot hands. Accordingly, since the capacity of a motor used for the robot hand is small, the grasping force of the robot hand is less than that of the hand of the human being. In addition, since the robot hand is structurally restricted, the robot hand has a degree of freedom less than that of the hand of the human being.

In order to increase the grasping force of the robot hand, it may be considered that a large-scale motor (generating large force) is installed in a robot arm (forearm part) instead of the robot hand, and wires transmit driving force of the motor to a finger joint. In this case, the wires pass through a wrist joint linking the robot hand with the forearm, and are wound around two pulleys in order to reduce friction caused when the wires pass through the wrist joint.

However, if the wrist joint operates, the two pulleys move, and an actuator moves in a yaw direction. The length of the wire is changed due to the movement of the actuator in the yaw direction. Since the length of the wire is restricted, the finger joint operates by the wire in order to cope with the length change of the wire. Accordingly, in order to prevent the operation of the wrist joint from exerting an influence on the movement of the finger joint, the operation of the finger joint must be individually controlled when the wrist joint operates. Such a driving structure complicates controlling of the finger joint due to the movement of the wrist joint.

Accordingly, it is necessary to consider a structure in which the length of the wire is not changed even if the wrist joint operates. In other words, the wire passes through the wrist joint coupling the forearm part with the robot hand, and is inserted into a tube, so that the length of the wire is constantly maintained even if the wrist joint operates. In this case, the tube constantly maintains the length of the wire regardless of the operation of the wrist joint. Therefore, even if the wrist joint operates, since the length of the wire is not changed, it is unnecessary to additionally control the actuator driving the wire.

However, the tube, into which the wire is inserted, causes friction with the wire. Accordingly, the driving force of the actuator is significantly lowered due to friction between the wire and the tube, and this is increased as range of motion of the wrist joint is increased. If the range of the motion of the wrist joint is increased, the tube is excessively bent, so that the friction between the wire and the tube is increased. Accordingly, in such a driving structure, power transmission efficiency of the actuator is remarkably reduced, and the range of the motion of the wrist joint is restricted.

SUMMARY

In an aspect of exemplary embodiments, there is provided a robot having a finger joint that does not interfere with a wrist joint by improving a structure of an actuator driving the finger joint.

In an aspect of an exemplary embodiment, there is provided a robot which includes a robot arm, a robot hand having a finger joint, a first actuator and a power transmission which drive the finger joint, and a wrist joint which rotates the robot hand about the robot arm, wherein the wrist joint includes a yaw-direction wrist joint to rotate the robot hand about the robot arm in a yaw direction, and wherein a position of the first actuator and the first power transmission is changed in cooperation with the yaw-direction wrist joint.

According to another aspect of an exemplary embodiment, the yaw-direction wrist joint may include a fixed frame provided at a side of the robot arm and a yaw-direction frame rotatably coupled with the fixed frame, and the first actuator may be coupled with the yaw-direction frame.

According to an aspect of an exemplary embodiment, the first actuator may be rotatably provided on the yaw-direction frame.

According to an aspect of an exemplary embodiment, the first actuator may include a shaft part inserted into the yaw-direction frame, and the yaw-direction frame may include a groove part receiving the shaft part.

According to an aspect of an exemplary embodiment, the first actuator may include a guide protrusion, and the robot arm may include a guide groove member receiving the guide protrusion.

According to an aspect of an exemplary embodiment, the first power transmission may include a wire linking the first actuator with the finger joint, and the wire may pass through the wrist joint.

According to an aspect of an exemplary embodiment, the wrist joint may include a pitch-direction wrist joint rotating the robot hand about the robot arm in a pitch direction, and the pitch-direction wrist joint may include the yaw-direction frame and a pitch-direction frame rotatably coupled with the yaw-direction frame.

According to an aspect of an exemplary embodiment, the pitch-direction frame may include a first rolling part, the yaw-direction frame may include a second rolling part, and the first rolling part may cause rolling friction with the second rolling part.

In accordance with an aspect of an exemplary embodiment, there is provided a robot including a robot arm, a robot hand having a finger joint, a wrist joint which couples the robot arm with the robot hand, a first actuator and a first power transmission which drive the finger wrist, a yaw-direction frame which allows the wrist joint to rotate about the robot arm in a yaw direction. The first actuator is coupled with the yaw-direction frame, so that a length of the first power transmission coupling the first actuator with the finger wrist is maintained.

According to an aspect of an exemplary embodiment, the yaw-direction frame may be rotatably coupled with the robot arm.

According to an aspect of an exemplary embodiment, the first actuator may include a shaft part coupled with the yaw-direction frame, and the yaw-direction frame may include a groove part receiving the shaft part.

According to an aspect of an exemplary embodiment, the first actuator may include a guide protrusion, and the robot arm may include a guide groove member receiving the guide protrusion.

According to an aspect of an exemplary embodiment, the wrist joint may include a pitch-direction frame allowing the robot hand to rotate about the robot arm in a pitch direction, and the pitch-direction frame may be rotatably coupled with the yaw-direction frame.

According to an aspect of an exemplary embodiment, the robot may include a second actuator and a second power transmission driving the wrist joint.

In an aspect of an exemplary embodiment, there is a robot that can sufficiently ensure the range of motion of a wrist joint since the length of wires is not changed even if the wrist joint operates.

Accordingly, exemplary embodiments are applicable to robots which can transmit power through the wires, such as a surgical operation robot, an endoscope robot, an exploration robot, and a robot handling dangerous substances.

BRIEF DESCRIPTION OF THE DRAWINGS

These and/or other aspects of exemplary embodiments will become apparent and more readily appreciated from the following description of exemplary embodiments, taken in conjunction with the accompanying drawings of which.

DETAILED DESCRIPTION

Figure 1:
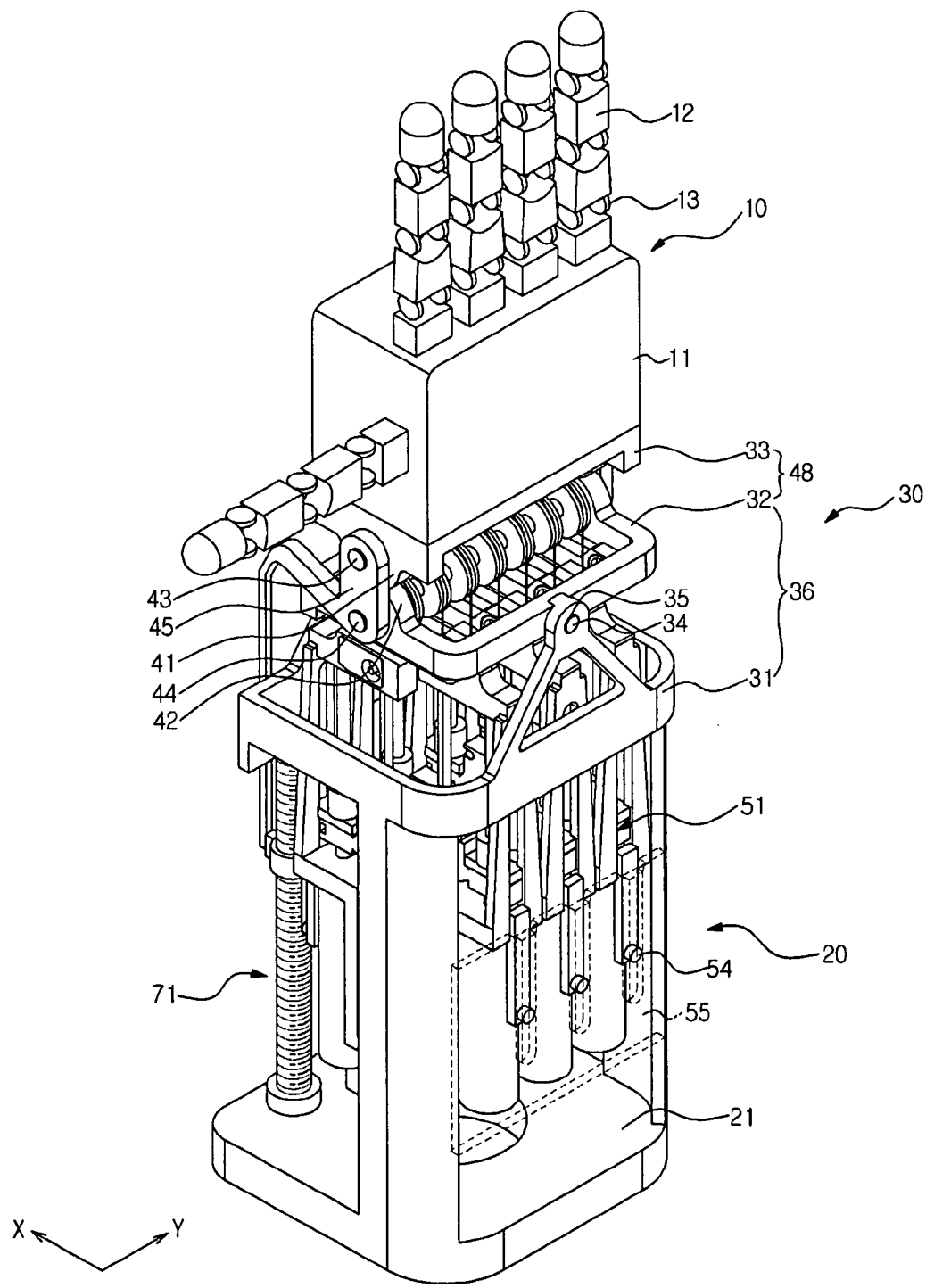
FIG. 1 is a view showing a robot hand and a robot arm according to an exemplary embodiment.

Reference will now be made in detail to exemplary embodiments, examples of which are illustrated in the accompanying drawings, wherein like reference numerals refer to the like elements throughout. Exemplary embodiments are described below by referring to the figures.

FIG. 1 shows a robot hand 10 and a robot arm 20 according to an exemplary embodiment.

As shown in FIG. 1, the robot according to an exemplary embodiment includes the robot hand 10 and the robot arm 20. A wrist joint 30 is interposed between the robot hand 10 and the robot arm 20. As the wrist joint 30 operates, the robot hand 10 can rotate about the robot arm 20 in a pitch direction (X-axis direction) or a yaw direction (Y-axis direction).

The robot arm 20 includes a forearm member 21 and an upper arm member (not shown), and they are jointed with each other through an elbow joint (not shown). FIG. 1 shows the forearm member 21 of the robot arm 20.

The robot hand 10 includes a hand body 11 and a finger member 12, and the hand body 11 is jointed with the finger member 12 through a finger joint 13. A plurality of finger members 12 are provided, and the plural finger members 12 are jointed with each other through the finger joint 13. As the finger joint 13 operates, the finger members 12 can rotate about the hand body 11.

The wrist joint 30 includes a fixed frame 31, a yaw-direction frame 32, and a pitch-direction frame 33. As the yaw-direction frame 32 rotates about the fixed frame 31, the robot hand 10 can rotate about the robot arm 20 in a yaw direction. As the pitch-direction frame 33 rotates about the yaw-direction frame 32, the robot hand 10 can rotate about the robot arm 20 in a pitch direction.

The fixed frame 31 is coupled with the forearm member 21, and may be integrally formed with the forearm member 21.

The yaw-direction frame 32 is rotatably coupled with the fixed frame 31. A shaft part 34 of the yaw-direction frame 32 is inserted into a groove part 35 of the fixed frame 31. The yaw-direction frame 32 and the fixed frame 31 form a yaw-direction wrist joint 36. When the yaw-direction wrist joint 36 is driven, the robot hand 10 rotates about the robot arm 20 in the yaw direction (Y-axis direction).

The pitch-direction frame 33 is rotatably coupled with the yaw-direction frame 32. A first rolling part 41 of the pitch-direction frame 33 makes contact with a second rolling part 42 of the yaw-direction frame 32, and a first rotation shaft 43 of the pitch-direction frame 33 is coupled with a second rotation shaft 44 of the yaw-direction frame 32 through a coupling member 45. When a coupling member 45 rotates about the second rotation shaft 44, the first rolling part 41 rolls while causing rolling friction with the second rolling part 42. A plurality of first rollers 46 (see FIG. 3) are mounted on the first rotation shaft 43, and a plurality of second rollers 47 (see FIG. 3) are mounted on the second rotation shaft 44. Wires are wound around the first and second rollers 46 and 47.

The pitch-direction frame 33 and the yaw-direction frame 32 form a pitch-direction wrist joint 48. When the pitch-direction wrist joint 48 is driven, the robot hand 10 rotates about the robot arm 20 in the pitch direction (X-axis direction). In addition, the pitch-direction frame 33 is coupled with the hand body 11, and may be integrally formed with the hand body 11.

Figure 2:
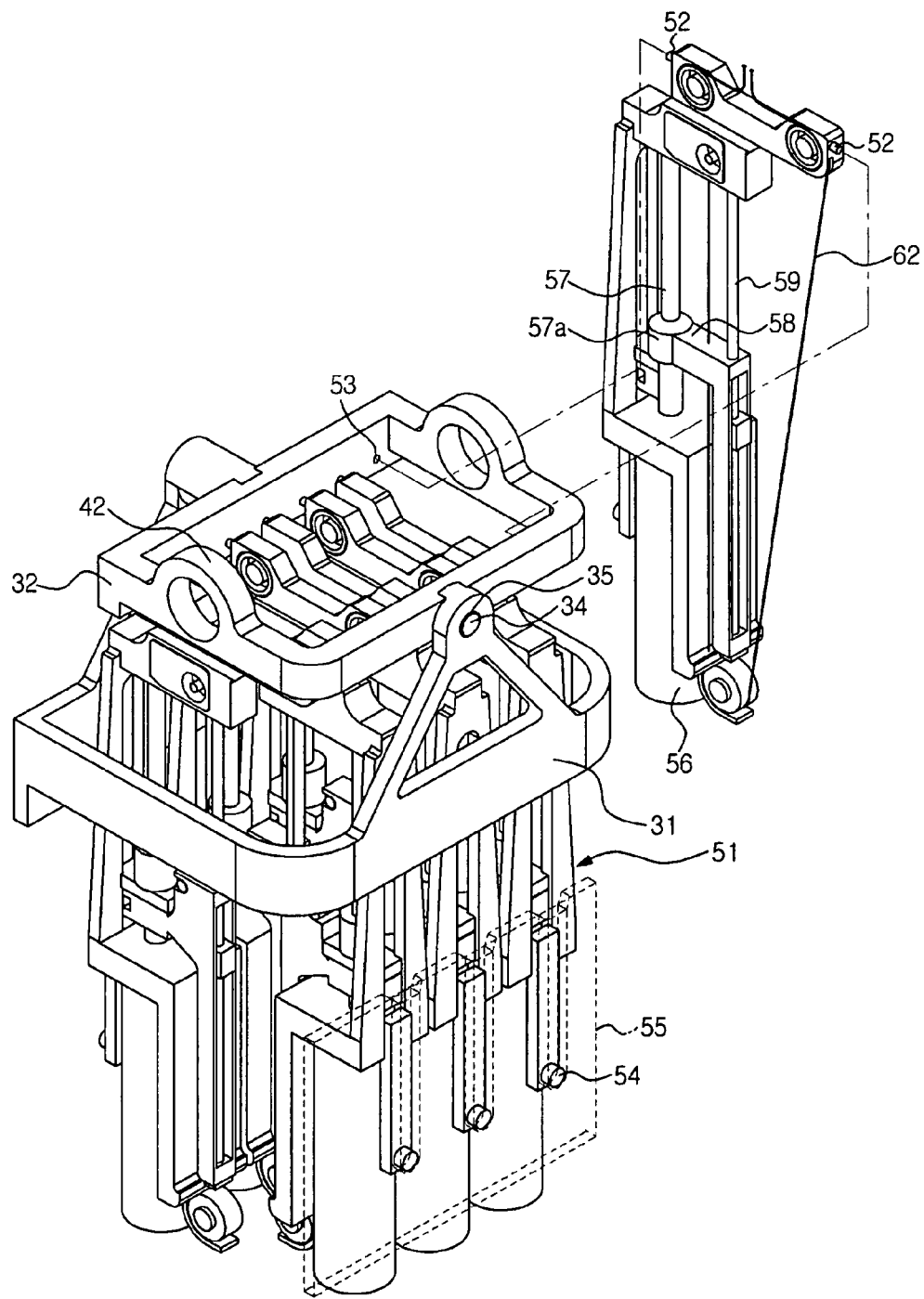
FIGS. 2 and 3 are views showing a first actuator and a first power transmission according to an exemplary embodiment.
Figure 3:
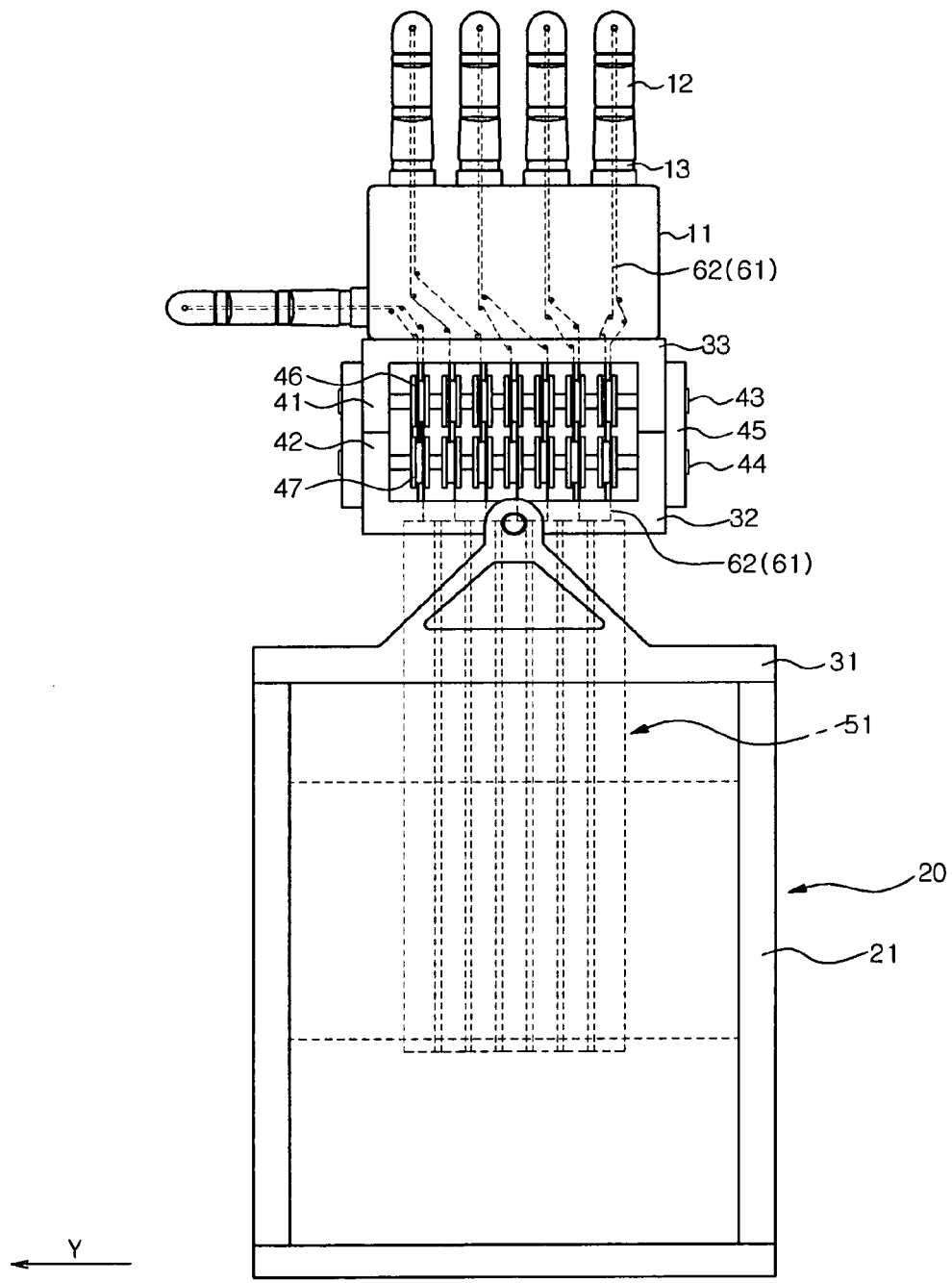

FIGS. 2 and 3 show a first actuator 51 and a first power transmission 61 according to an exemplary embodiment.

As shown in FIGS. 1 to 3, the first actuator 51 according to an exemplary embodiment is installed in the yaw-direction frame 32. A shaft part 52 of the first actuator 51 is inserted into a hole 53 of the yaw-direction frame 32. When the yaw-direction frame 32 rotates about the fixed frame 31, the first actuator 51 operates in cooperation with the yaw-direction frame 32. Accordingly, the distance between the first actuator 51 and the yaw-direction frame 32 is constantly maintained.

A plurality of first actuators 51 are provided, and a guide groove member 55 is provided to guide the first actuators 51 such that the first actuators 51 does not interfere with each other. A guide protrusion 54 of each first actuator 51 is inserted into the guide groove member 55 to guide the operation of each plural first actuator 51. Accordingly, it is possible to prevent the plural first actuators 51 from interfering with each other. Preferably, the guide groove member 55 is mounted on the forearm member 21.

The first actuator 51 includes a motor 56 and a ball screw part 57 driven by the motor 56, and the first power transmission 61 includes a wire 62, a wire fixing member 58, and a wire guide member 59. A nut part 57a of the ball screw part 57 is coupled with the wire fixing member 58, and the wire 62 is fixed to the wire fixing member 58. Accordingly, if the nut part 57a moves up or down, the wire fixing member 58 moves up or down with the nut part 57a, and the wire 62 moves up or down with the wire fixing member 58. If the motor 56 is driven, the wire 62 moves up or down by the ball screw part 57, so that power is transmitted.

The wire 62 serves as the first power transmission 61 to deliver driving force of the first actuator 51 to the finger joint 13. The wire 62 couples the first actuator 51 with the finger joint 13 while passing through the wrist joint 30. In other words, the wire 62 passes through the yaw-direction wrist joint 36 and the pitch-direction wrist joint 48. In particular, while passing through the pitch-direction wrist joint 48, the wire 62 is alternately wound around the first and second rollers 46 and 47. When the wire 62 passes through the yaw-direction wrist joint 36 and the pitch-direction wrist joint 48 as described above, even if the yaw-direction wrist joint 36 and the pitch-direction wrist joint 48 operate, the length of the wire 62 linking the first actuator 51 with the finger joint 13 is constantly maintained. If the length of the wire 62 linking the first actuator 51 with the finger joint 13 is not changed when the wrist joint 30 operates, the finger joint 13 is not driven. Accordingly, the wrist joint 30 must be driven independently on the finger joint 13. Details thereof will be described later.

Figure 4:
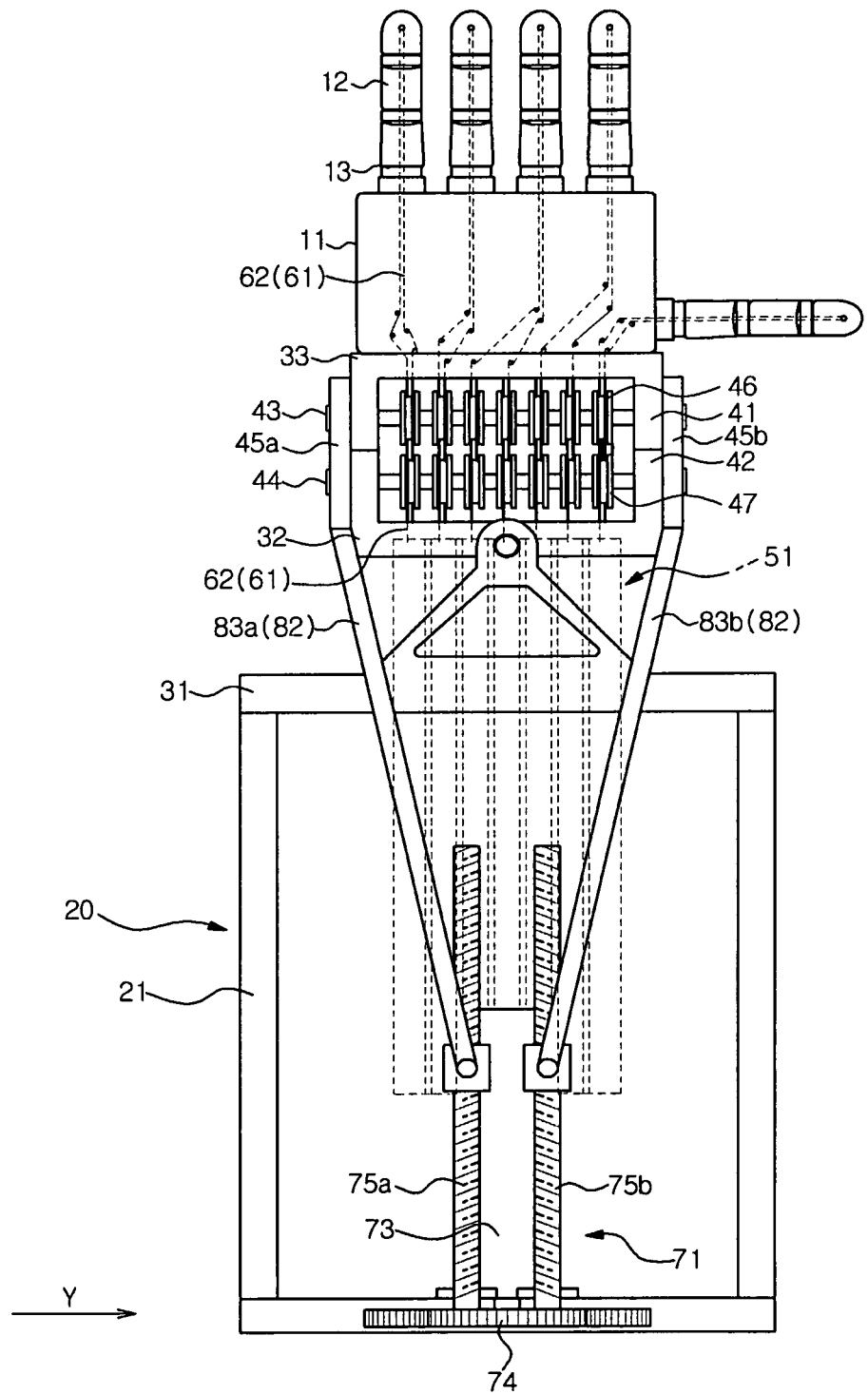
FIG. 4 is a view showing a second actuator and a second power transmission according to an exemplary embodiment.

FIG. 4 shows a second actuator 71 and a second power transmission 82 according to an exemplary embodiment.

As shown in FIGS. 1 to 4, the second actuator 71 according to an exemplary embodiment is installed in the forearm member 21. The second actuator 71 includes a motor 73, and a first ball screw 75a and a second ball screw 75b driven by the motor 73. The second power transmission 82 includes a first transmission member 83a and a second transmission member 83b. The motor 73, the first ball screw 75a, and the second ball screw 75b are coupled with each other by the coupling 74.

One end of the first transmission member 83a is coupled with a first coupling member 45a, and the other end of the first transmission member 83a is coupled with the first ball screw 75a. The first transmission member 83a moves up or down by the first ball screw 45a. One end of the second transmission member 83b is coupled with a second coupling member 45b, and the other end of the second transmission member 83b is coupled with the second ball screw 75b. The second transmission member 83b moves up or down by the second ball screw 75b. As the first and second transmission members 83a and 83b move up or down, the wrist joint 30 operates.

As the second actuator 71 and the second power transmission 82 drive the wrist joint 30, the robot hand 10 can rotate about the robot arm 20 in the pitch direction or the yaw direction. Details thereof will be described in more detail below.

Figure 5:
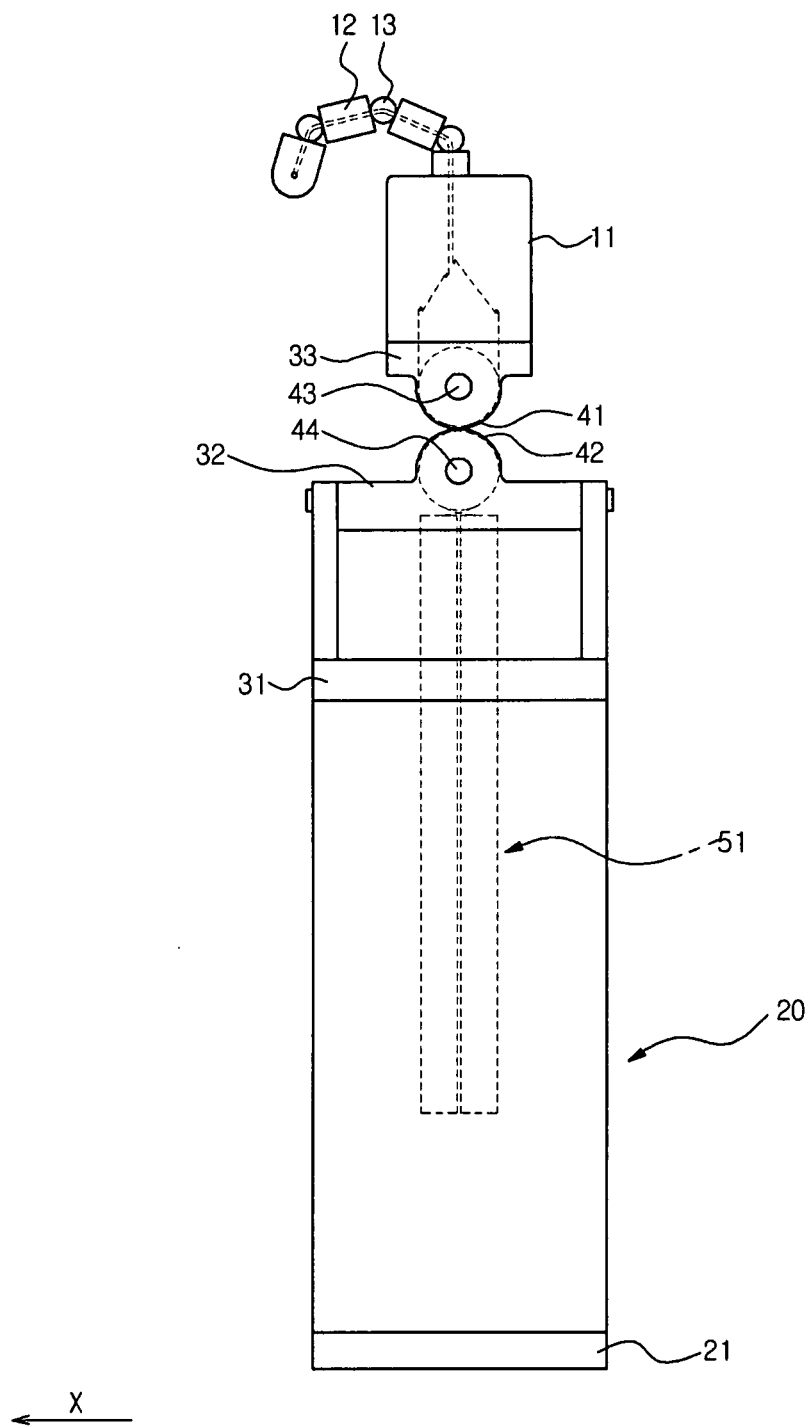
FIG. 5 is a view showing an operation of a robot hand by a first actuator and a first power transmission according to an exemplary embodiment.

FIG. 5 is a view showing an operation of the robot hand 10 by the first actuator 51 and the first power transmission 61 according to an exemplary embodiment.

As shown in FIGS. 1 to 5, the first actuator 51 and the first power transmission 61 drive the robot hand 10 according to an exemplary embodiment. In other words, the wire 62 drives the finger joint 13 so that the finger member 12 pivotally rotates about the hand body 11 or is bent as shown in FIG. 5. Accordingly, the robot hand 10 can grasp an object or perform other operations. The first actuator 51 and the first power transmission 61 drive the finger joint 13 so that the finger joint 13 returns to an original position thereof as shown in FIG. 1.

Figure 6:
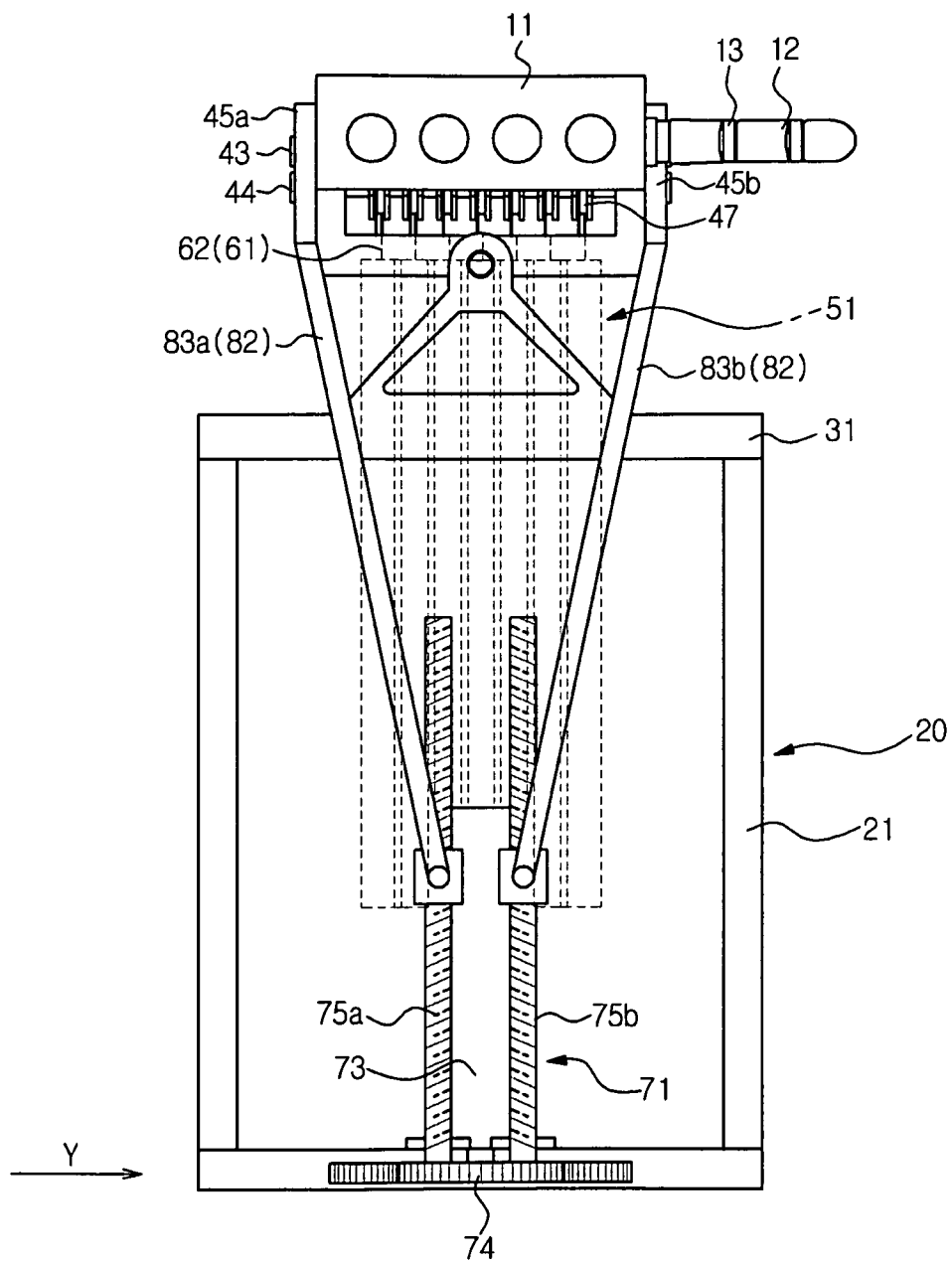
FIGS. 6 and 7 are views showing pitch-direction rotation of a robot hand by a second actuator and a second power transmission according to an exemplary embodiment.
Figure 7:
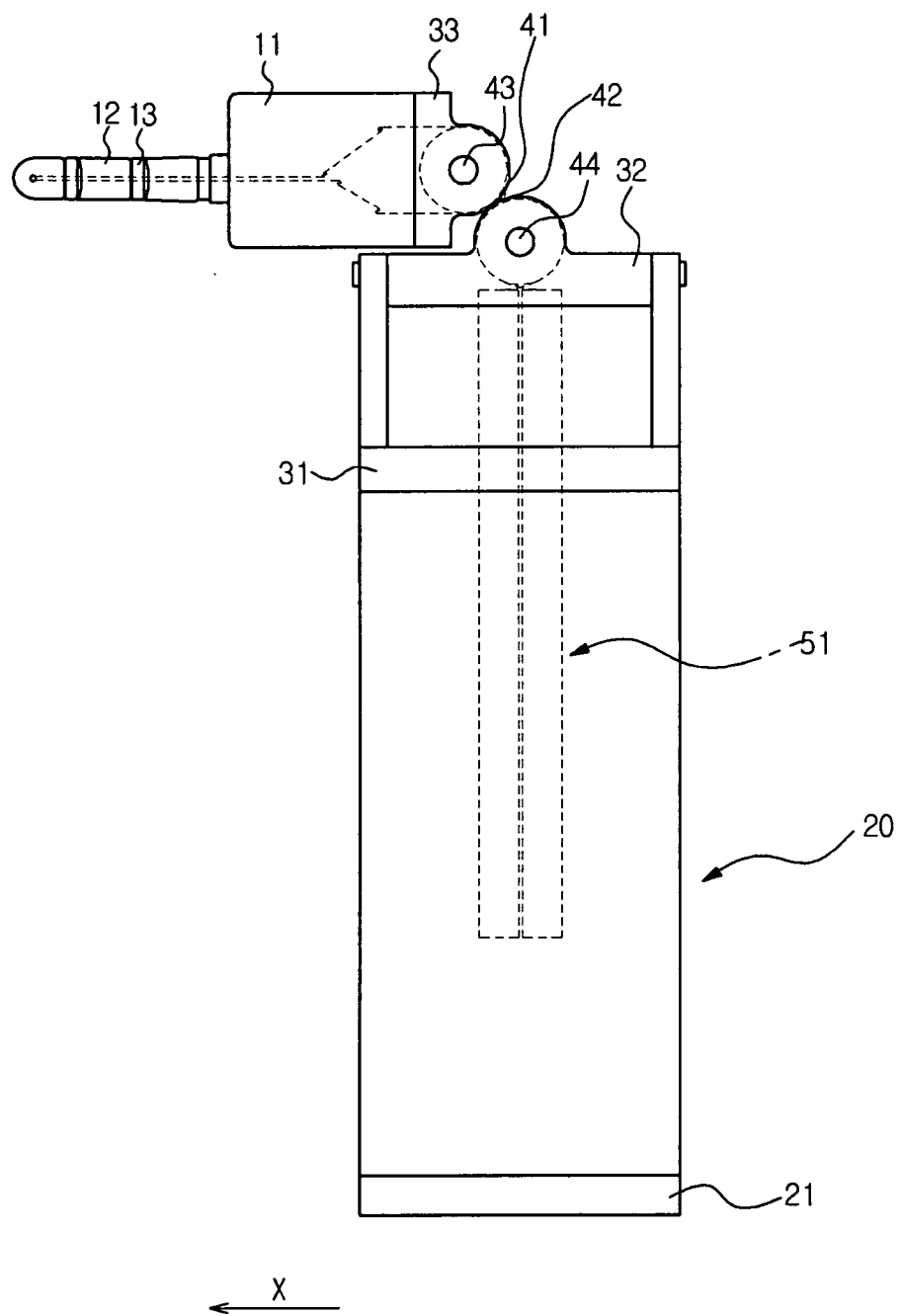

FIGS. 6 and 7 are views showing pitch-direction rotation of the robot hand 10 by the second actuator 71 and the second power transmission 82 according to an exemplary embodiment.

As shown in FIGS. 1 to 7, the second actuator 71 and the second power transmission 82 according to an exemplary embodiment rotate the robot hand 10 about the robot arm 20 in the pitch direction.

If the second actuator 71 operates, the first transmission member 83a moves down along the first ball screw 75a, and the second transmission member 83b moves down along the second ball screw. In this case, the first rolling part 41 rolls on the second rolling part 42, so that the pitch-direction frame 33 rotates about the yaw-direction 32. Accordingly, the robot hand 10 can rotate about the robot arm 20 in the pitch direction.

In contrast, the second actuator 71 operates, so that the first transmission member 83a moves up along the first ball screw 75a, and the second transmission member 83b moves up along the second ball screw 75b. In this case, the robot hand 10 can rotate in a direction opposite to a direction of the robot hand 10 shown in FIG. 7.

Even if the first rolling part 41 rolls on the second rolling part 42, the length of the wire 62 passing through the pitch-direction wrist joint 48 is constantly maintained. Since the length of the wire 62 is constantly maintained, even if the pitch-direction wrist joint 48 rolls, the finger joint 13 does not operate. Therefore, the pitch-direction wrist joint 48 driven by the second actuator 71 and the second power transmission 82 can be driven independently on the finger joint 13 driven by the first actuator 51 and the first power transmission 61.

Figure 8:
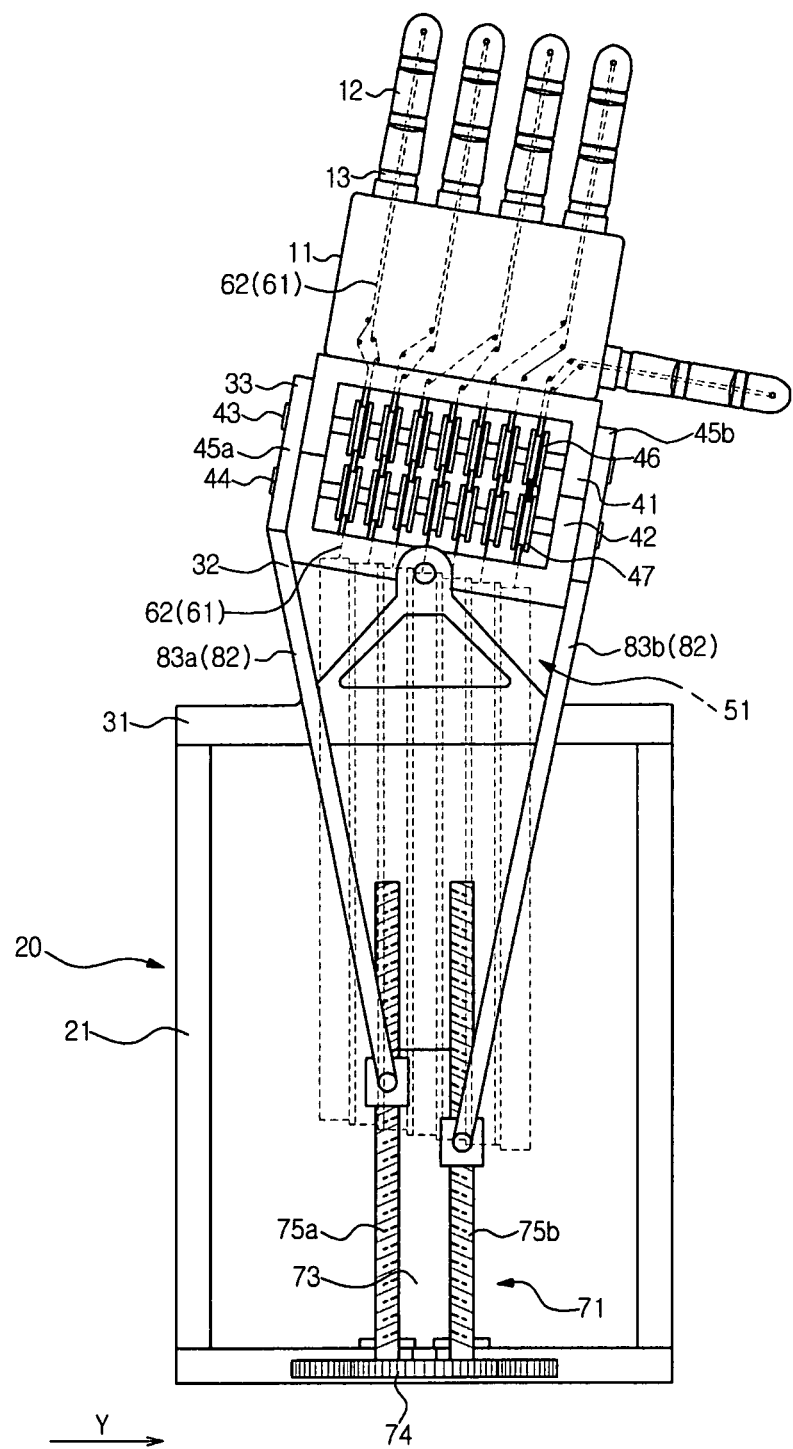
FIG. 8 is a view showing yaw-direction rotation of a robot hand by a second actuator and a second power transmission according to an exemplary embodiment.

FIG. 8 is a view showing yaw-direction rotation of the robot hand 10 by the second actuator 71 and the second power transmission 82 according to an exemplary embodiment.

As shown in FIGS. 1 to 8, the second actuator 71 and the second power transmission 82 according to an exemplary embodiment rotate the robot hand 10 about the robot arm 20 in the yaw direction.

If the second actuator 71 operates, the first transmission member 83a moves up along the first ball screw 75a, and the second transmission member 83b moves down along the second ball screw 75b. In this case, the yaw-direction frame 32 rotates about the fixed frame 31, and the robot hand 10 rotates about the robot arm 20 in the yaw direction.

In contrast, the second actuator 71 operates, so that the first transmission member 83a moves down along the first ball screw 75a, and the second transmission member 83b moves up along the second ball screw 75b. In this case, the yaw-direction frame 32 rotates about the fixed frame 31, so that the robot hand 10 rotates in a direction opposite to a direction of the robot hand 10 shown in FIG. 8.

As the yaw-direction frame 32 rotates, the first actuators 51 coupled with the yaw-direction frame 32 operates. In addition, since the first actuators 51 are rotatably installed in the yaw-direction frame 32, even if the yaw-direction frame 32 is tilted, the first actuators 51 are not tilted excessively. In this case, the first actuators 51 are positioned with different heights corresponding to the inclination of the yaw-direction frames 32.

Accordingly, even if the yaw-direction frame 32 rotates, the length of the wire 62 linking the first actuator 51 with the finger joint 13 is not changed. Therefore, the yaw-direction wrist joint 34 driven by the second actuator 71 and the second power transmission 82 operates independently on the finger joint 13 driven by the first actuator 51 and the first power transmission 61.

Although few exemplary embodiments have been shown and described, it would be appreciated by those skilled in the art that changes may be made in these exemplary embodiments without departing from the principles and spirit of the disclosure, the scope of which is defined in the claims and their equivalents.

What is claimed is:

1. A robot comprising:
   a robot arm;
   a robot hand having a finger joint;
   a first actuator and a power transmission which drive the finger joint; and
   a wrist joint which rotates the robot hand about the robot arm,
   wherein the wrist joint includes a yaw-direction wrist joint to rotate the robot hand about the robot arm in a yaw direction,
   wherein a position of the first actuator and the first power transmission is changed in cooperation with the yaw-direction wrist joint, and
   wherein the yaw-direction wrist joint includes a fixed frame provided at a side of the robot arm and a yaw-direction frame rotatably coupled with the fixed frame, and wherein the first actuator is coupled with the yaw-direction frame.

2. The robot of claim 1, wherein the first actuator is rotatably provided on the yaw-direction frame.

3. The robot of claim 2, wherein the first actuator includes a shaft part inserted into the yaw-direction frame, and the yaw-direction frame includes a hole receiving the shaft part.

4. The robot of claim 2, wherein the first actuator includes a guide protrusion, and the robot arm includes a guide groove member receiving the guide protrusion.

5. The robot of claim 1, wherein the first power transmission includes a wire linking the first actuator with the finger joint, and the wire passes through the wrist joint.

6. The robot of claim 1, wherein the wrist joint includes a pitch-direction wrist joint rotating the robot hand about the robot arm in a pitch-direction, and the pitch-direction wrist joint includes the yaw-direction frame and a pitch-direction frame rotatably coupled with the yaw-direction frame.

7. The robot of claim 6, wherein the pitch-direction frame includes a first rolling part, the yaw-direction frame includes a second rolling part, and the first rolling part causes rolling friction with the second rolling part.

8. A robot comprising:
   a robot arm;
   a robot hand having a finger joint;
   a wrist joint which couples the robot arm with the robot hand;
   a first actuator and a first power transmission which drive the finger joint; and
   a yaw-direction frame which allows the wrist joint to rotate about the robot arm in a yaw direction,
   wherein the first actuator is coupled with the yaw-direction frame, so that a length of the first power transmission coupling the first actuator with the finger joint is maintained,
   wherein the yaw-direction frame is rotatably coupled with the robot arm, and
   wherein the first actuator includes a shaft part coupled with the yaw-direction frame, and the yaw-direction frame includes a hole receiving the shaft part.

9. The robot of claim 8, wherein the first actuator includes a guide protrusion, and the robot arm includes a guide groove member receiving the guide protrusion.

10. The robot of claim 8, wherein the wrist joint includes a pitch-direction frame allowing the robot hand to rotate about the robot arm in a pitch direction, and the pitch-direction frame is rotatably coupled with the yaw direction frame.

11. The robot of claim 8, further comprising a second actuator and a second power transmission driving the wrist joint.

* * * * *